May 2, 1933. J. M. WOLF 1,907,378
PUMP AND MOTOR FLUID TRANSPORTING MECHANISM
Original Filed April 24, 1930 8 Sheets-Sheet 1

INVENTOR.
J. M. Wolf
BY
ATTORNEY.

May 2, 1933.  J. M. WOLF  1,907,378
PUMP AND MOTOR FLUID TRANSPORTING MECHANISM
Original Filed April 24, 1930   8 Sheets-Sheet 2
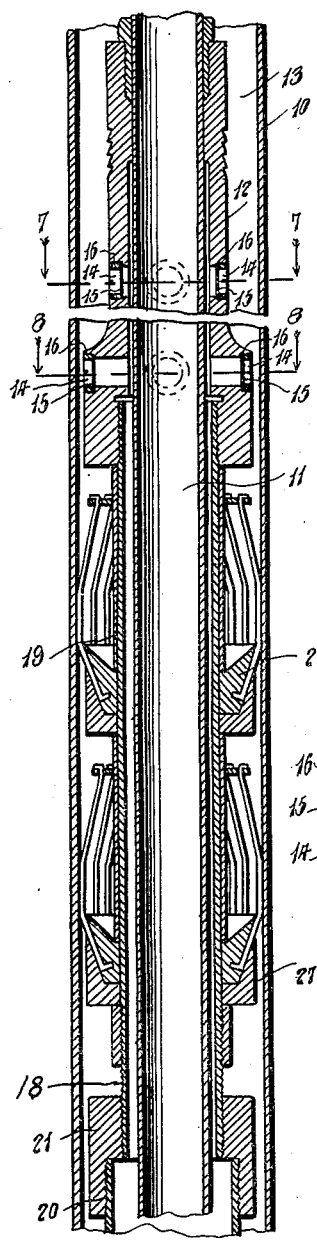
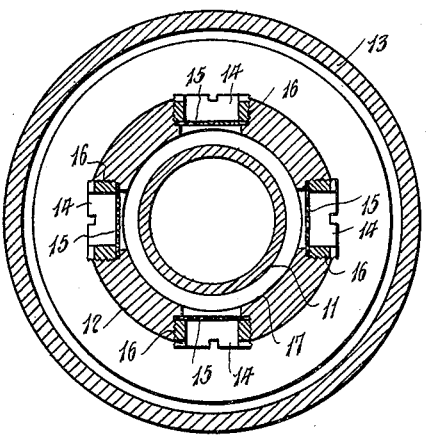
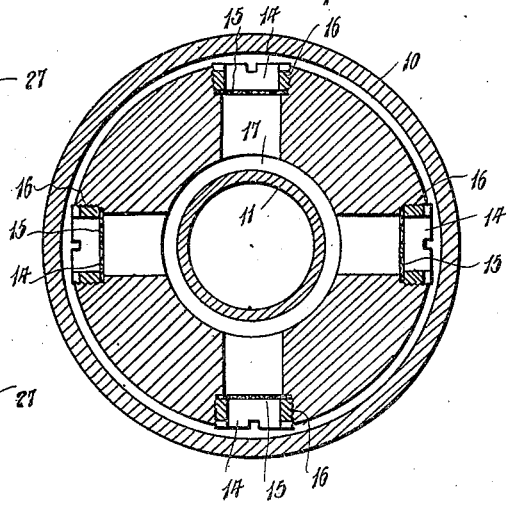
Inventor
J. M. Wolf.
Attorney

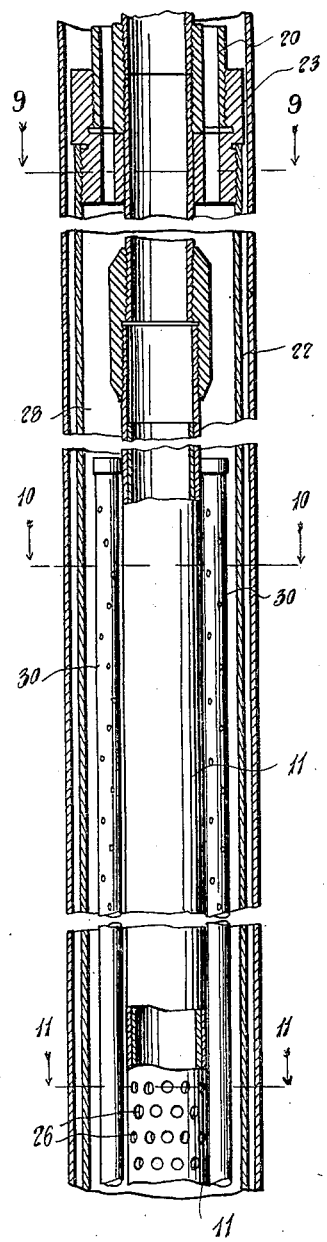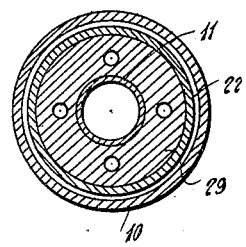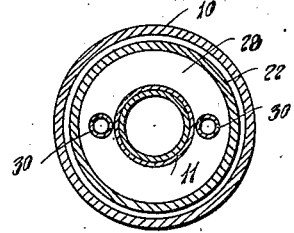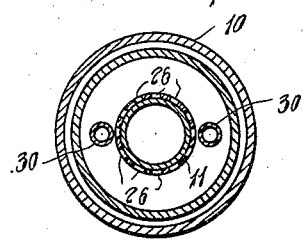

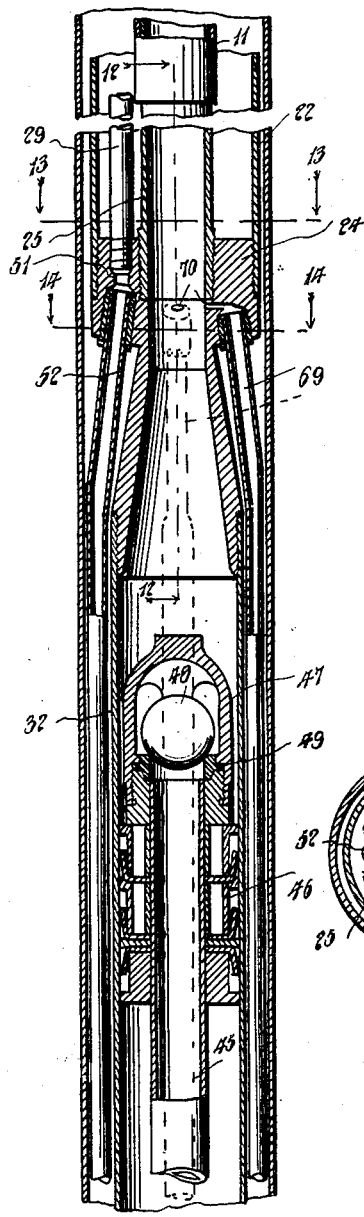
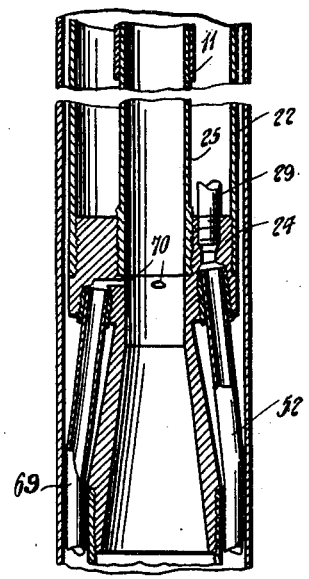
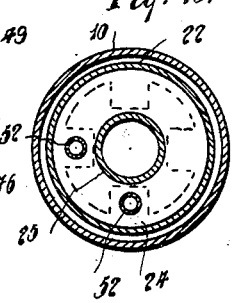
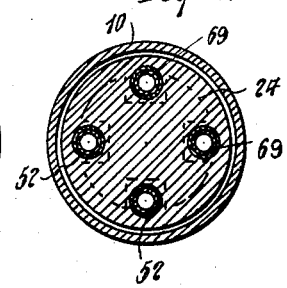

May 2, 1933.    J. M. WOLF    1,907,378
PUMP AND MOTOR FLUID TRANSPORTING MECHANISM
Original Filed April 24, 1930    8 Sheets-Sheet 5

Inventor
J. M. Wolf
By
Attorney

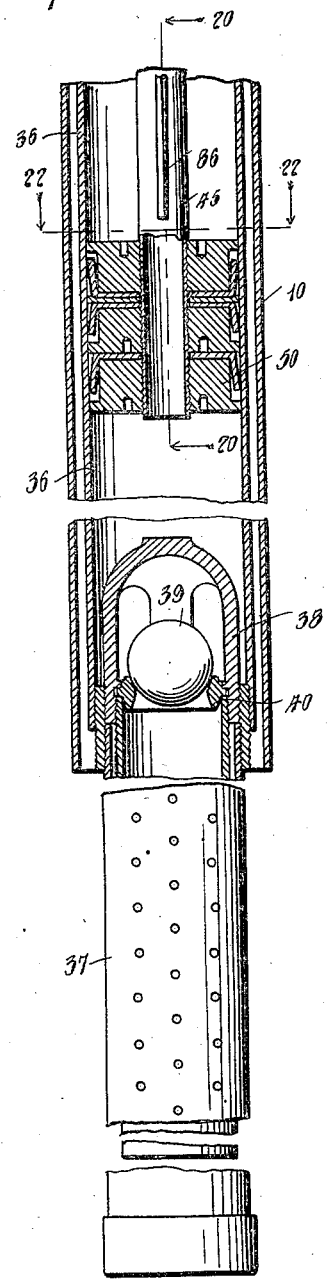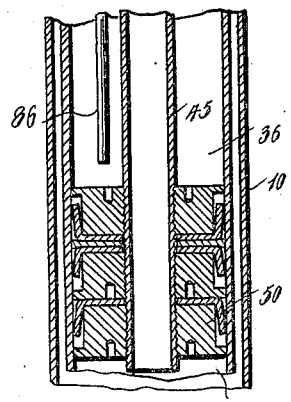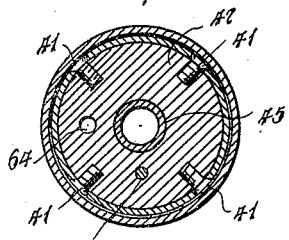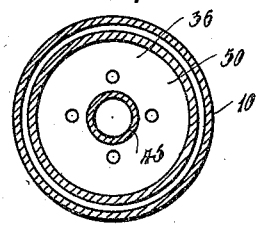

May 2, 1933. J. M. WOLF 1,907,378
PUMP AND MOTOR FLUID TRANSPORTING MECHANISM
Original Filed April 24, 1930 8 Sheets-Sheet 8
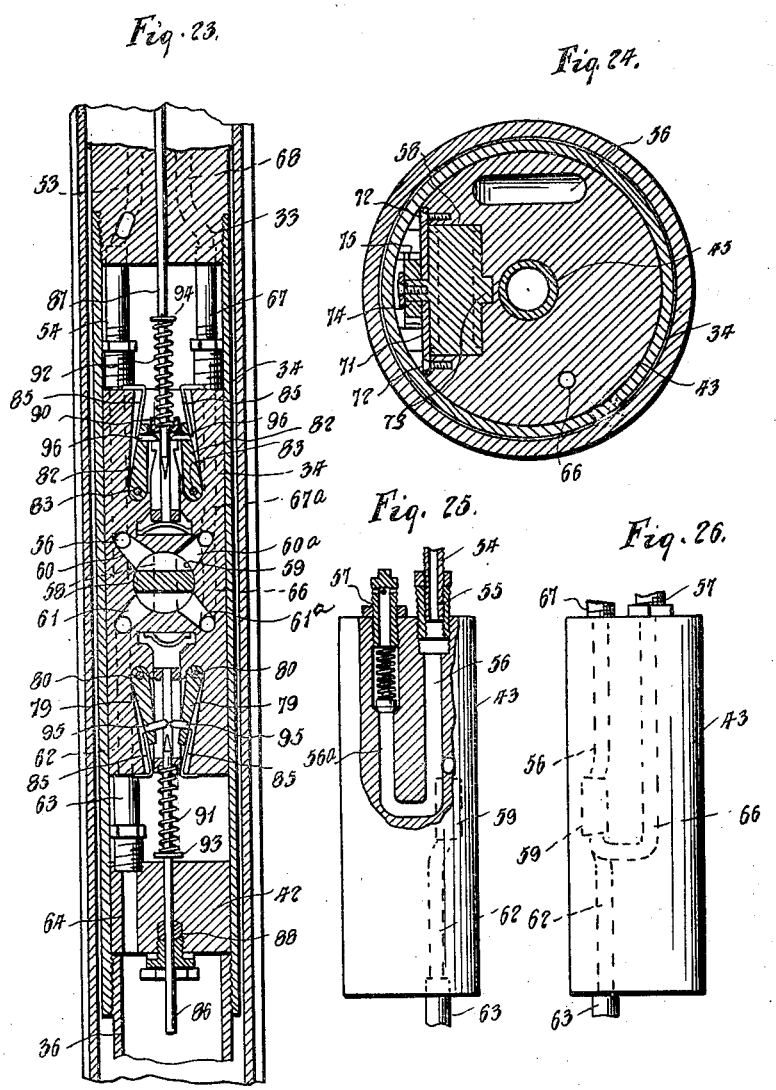
Inventor
J. M. Wolf.

Patented May 2, 1933

1,907,378

UNITED STATES PATENT OFFICE

JOHN M. WOLF, OF KANSAS CITY, MISSOURI, ASSIGNOR OF ONE-HALF TO CARL BINGESSER, OF WACONDA SPRINGS, KANSAS

PUMP AND MOTOR FLUID TRANSPORTING MECHANISM

Original application filed April 24, 1930, Serial No. 446,989. Divided and this application filed October 16, 1930, Serial No. 489,168. Renewed December 15, 1932.

This invention relates to a forced feed fluid transporting mechanism particularly adapted for use in connection with wells and which is of the general character disclosed in my Patent #1,792,723, issued February 17, 1931; and application filed April 24, 1930, Serial No. 446,989, patented Nov. 1, 1932, #1,885,-665.

The present application is a division of said application filed April 24, 1930, Serial 446,989, patented Nov. 1, 1932, #1,885,665.

The particular aim of the present invention is to provide a novel motor and pump combination.

It is also aimed to provide a novel construction having a flow tube in relatively movable sections having openings adapted to communicate through relative movement to cause the operating fluid for the pump to pass through the sections.

It is also aimed to provide a novel construction wherein the exhaust from the pumping mechanism employed may discharge into the flow tube.

The more specific objects and advantages will become apparent from a consideration of the description following taken in connection with accompanying drawings wherein :—

Figures 2, 3, 4, 5 and 6 are central vertical sectional views of sections or portions of the apparatus constituting my invention and are to be considered successively, as showing the complete apparatus from the top or upper portion in Figure 2 to the bottom or lower portion in Figure 6;

Figure 1:
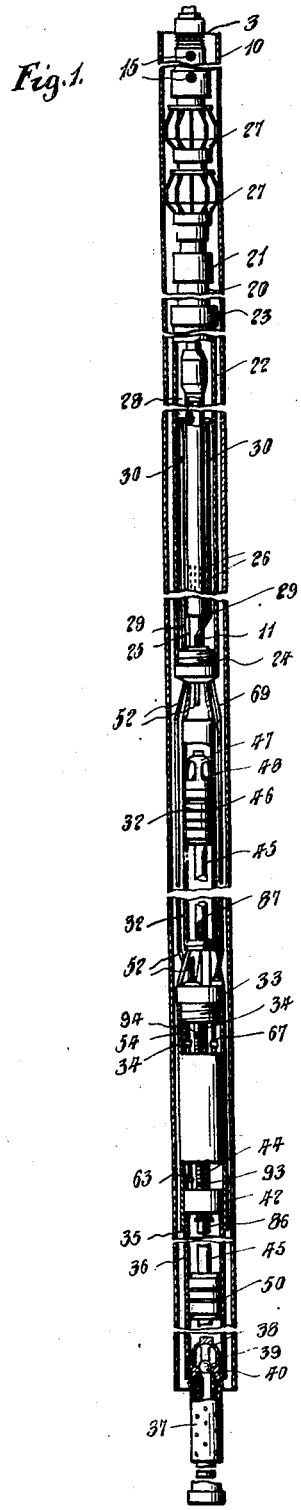
Figure 1 is a longitudinal sectional view of a complete mechanism constituting the invention, part being in elevation and part in section to better disclose details.
Figure 5:
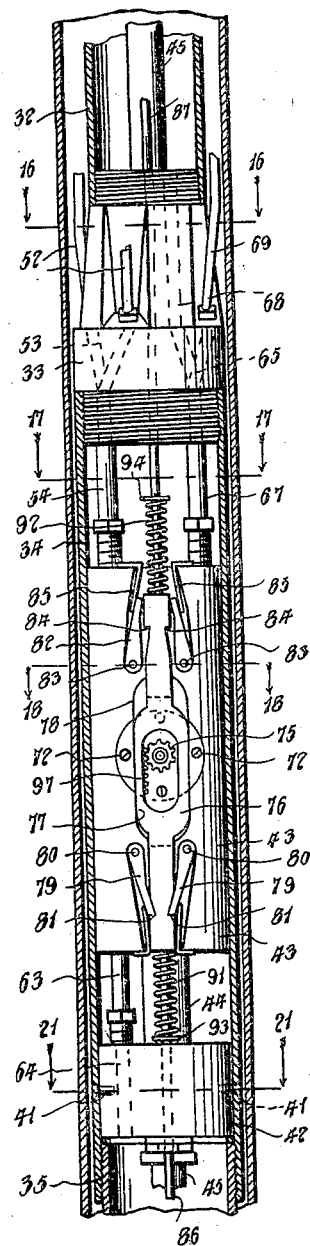
Figure 15:
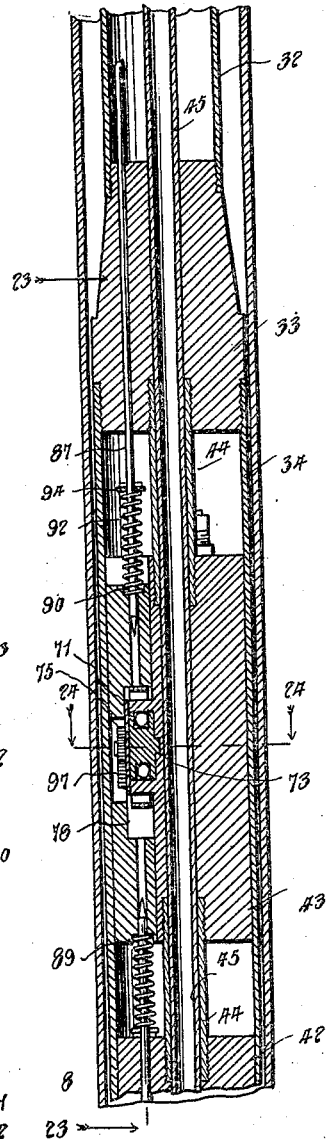
Figure 16:
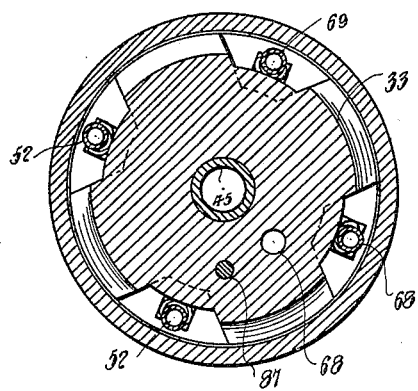
Figure 17:
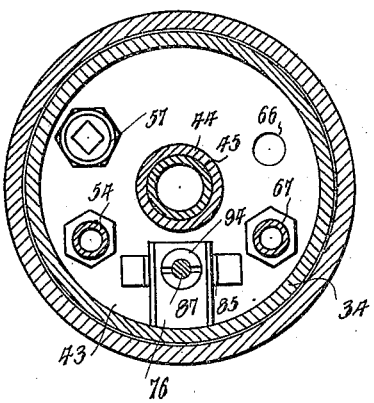
Figure 18:
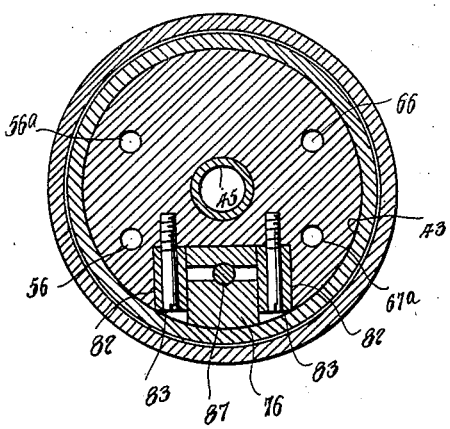
Figure 19:
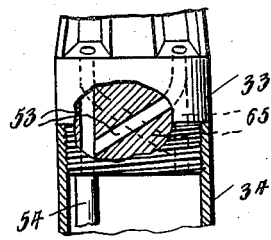

Figures 7 and 8 are cross sectional views on an enlarged scale taken on the lines 7—7 and 8—8, respectively, of Figure 2;

Figures 9, 10 and 11 are cross sectional views taken on the lines 9—9, 10—10 and 11—11, respectively, of Figure 3;

Figures 12, 13 and 14 are sectional views taken on the lines 12—12, 13—13 and 14—14, respectively, of Figure 4;

Figure 15 is a longitudinal sectional view taken through the parts of Figure 5 and at a right angle thereto;

Figures 16, 17 and 18, respectively, are cross sectional views taken on the lines 16—16, 17—17 and 18—18 of Figure 5;

Figure 19 is a detail elevation, partly broken away, illustrating the fluid inlet passages of the upper block;

Figure 20 is a detail sectional view taken on the line 20—20 of Figure 6;

Figure 21 is a cross sectional view taken on the line 21—21 of Figure 5;

Figure 22 is a cross sectional view taken on the line 22—22 of Figure 6;

Figure 23 is a longitudinal sectional view taken on the line 23—23 of Figure 15;

Figure 24 is a cross-sectional view taken on the line 24—24 of Figure 15; and

Figures 25 and 26 are detail elevations taken from reverse sides of the valve mounting block, the former being partly broken away to disclose details.

Referring specifically to the drawings, 10 designates the usual casing as employed in connection with oil wells. A flow pipe or discharge tube is arranged centrally of the casing as at 11. Surrounding the flow tube or pipe adjacent the top of the casing and fixed so that the tube may slide therein, is an inlet head 12 for power fluid. Power fluid from any suitable source and under appropriate control is applied to the space 13 at the top of the casing and is adapted to enter the head 12 through ports 14 in each of which is preferably fastened a filter 15 such as a piece of textile or metallic cloth, held in place by wing nuts 16. A portion of the bore of the head 12 is enlarged as at 17 to accommodate the power fluid. Such power fluid may be compressed air, steam or the like.

Surrounding the flow pipe 11 is a power fluid confining pipe generally designated 18, the same having an upper section 19 screw threaded to the head 12, a section 20 secured to section 19 by a screw coupling 21, a section 22 secured by a screw coupling 23 to the section 20, the latter being screw threaded to an upper barrel head 24. Barrel head 24 is held against sliding movement and has a nipple or pipe 25 rising therefrom and constituting part of the flow pipe of the well. The lower portion of the flow pipe 11 is telescoped over the nipple or pipe 25 to form valve means since the telescoped portions as best shown in Figures 3 and 11 have openings 26 therethrough adapted at times to register through sliding movement of the flow pipe and normally to remain out of register. When such ports are in register, the power fluid is permitted to return into the flow pipe 11 and outside of the well, to aid in dislodging any obstruction in the flow pipe and generally clean out the entire flow line above such openings. Mounted on the exterior of the pipe 18 in any suitable manner, are one or more rubber or other swabs 27, of any conventional form, which serve to seal the well against passage of power fluid past the same and thus form the bottom of the chamber 13.

All of the pipes constituting the section 18 are of greater diameter than the flow pipe and hence a passage is provided about the same generally designated 28, for the downward passage of the power fluid.

Disposed in the space 28 are inlet pipes for the power fluid designated 29, the same being screw threaded as best shown in Figure 4 to the upper barrel head 24 and the same being perforated as at 30 so that the power fluid may enter the same.

Screwed to the barrel head 24 is a barrel section 32 which is also screwed to an upper block 33. Block 33 has another barrel section 34 screwed thereto to which is screwed, at 35, a lower barrel section 36. The lower barrel section 36 has a perforated oil inlet trap or pipe 37 suitably attached thereto which carries a cage 38 at its top, which is of hollow form, and confines a ball valve 39 adapted to engage a seat 40 therein, at times, this structure constituting the lower or inlet valve of the device for the oil to trap it after it is sucked up, so that it may be pumped or expressed through the flow tube and passages in communication therewith or forming part thereof.

Fastened in the barrel section 34 as by means of screws 41 is a lower head 42 and located within such section 34 midway of the heads 33 and 42, is a valve mounting block 43 which is rigidly connected with said blocks 33 and 42 by means of short pipes 44 connected by screw threads to the respective parts as best shown in Figure 15.

A suitable piston is employed within the device having a hollow rod 45 which is slidably mounted through the block 33, pipe 44, block 43, pipe 45 and block 42.

As shown in Figure 4, the piston tube or rod 45 carries a head 46 of any desired construction which will provide intimate wiping and sealing contact with the bore of the barrel section 32. Such piston 46 mounts a cage 47 of skeleton or perforated form as shown which is adapted to communicate with the bore of the barrel section 32 and which mounts a ball valve 48 which at times engages a seat 49 carried by the cage. When the valve 48 is closed as shown in Figure 4, oil in the flow pipe cannot pass the same and return to the well.

On the other hand, upward displacement or flow of the oil will displace the valve 48 so that the same may pass through the cage and into the flow pipe.

At the lower end of the piston rod 45 and within the barrel section 36, is a lower piston head 50 which is of any suitable or conventional construction adapted to intimately wipe and have sealing engagement with the bore of the section 36.

It will be realized that on the up-stroke of the piston, the valve 48 will be closed and the valve 39 open whereby oil will be trapped for discharge through the flow pipe while on the down-stroke of the piston, the valve 39 will close to effect the trapping of the oil and the valve 48 will be open, so that the oil will pass from the barrel section 36, through the hollow piston rod 45 into barrel section 32 and from the same through the head 24, nipple 25 and flow pipe 11.

Through passages 51 in the barrel head 24, the power fluid from pipes 29 passes through pipes 52 which are screw threaded to said head 24 and which are screw threaded in passageways 53 of the block 33, such passages converging and communicating with an inlet pipe 54 screw threaded to block 33 and having suitable detachable connection at 55 with the valve mounting block 43. Such pipe 54 communicates with a passage 56 in said valve mounting block, said passage being of U-shape, as shown in Figure 25, and has a suitable relief valve 57, mounted in branch 56ᵃ of said passage 56, said valve 57 being normally closed. Said valve 57 automatically operating to release excessive pressure and power fluid in the event of an over feed into the apparatus.

A valve to control the inlet and exhaust of the power fluid is shown at 58, being of the rotary type and operable on a horizontal axis and in a chamber 59, with which the passageway 56 communicates through a branch 60. Power fluid entering chamber 59 by branch 60, the valve being in the position shown in full lines in Figure 23, is directed through branch 60ᵃ into a passageway 67ᵃ to a pipe 67 and from thence through passageway 68 into barrel section 32 under piston 46, thus raising said piston 46, tubular piston rod 45 and the piston 50 in barrel section 36.

During this operation power fluid will be exhausted from the barrel section 36 through a passageway 64 in block 42, a pipe 63 communicating therewith, and a passageway 62 in valve block 43, through a branch 61 into valve chamber 59, then through a branch 61ᵃ into a passageway 66, in the valve block 43, into the space between valve block 43 and block 33, thence into and through passages 65 in block 33, and thence through pipes 69 screwed or otherwise attached to the block 33 and which communicates with the flow line at ports 70 in the head 24.

Referring to Figure 23, the position of valve 58, as shown in full lines, is such that power fluid is supplied to barrel section 32 and exhausted from barrel section 36 by reason of the path just traced. When the valve 58 is in the dotted line position of Figure 23 power fluid entering valve chamber 59 is directed through branch 61, passage 62, pipe 63 and passage 64 into barrel section 36 above the piston 50, to drive it downwardly, and at the same time exhaust from barrel section 32 takes place through passage 68, pipe 67, passage 56, through valve chamber 59 and out through branch 61ᵃ as above described. A suitable means is provided to automatically shift the position of the valve 58 for the inlet and exhaust of the power fluid, through the operation of the piston, as will now be described.

Said valve 58 is held in its chamber by a retaining plate 71 screwed at 72 to the block 43, the valve having trunnions 73 and 74, the former being journaled in the block 43 and the latter journaled in the plate 71 and extending outwardly beyond the same and having a pinion 75 fixed thereon. A valve actuating slide 76 is movable longitudinally of the block 43, having an enlargement 77 disposed in a slot or passageway 78 in the block and of such length as to engage the same at its ends at its opposite extremes of movement, thus limiting the movement of the valve actuating slide and accordingly of the valve.

When the valve 58 is in full line position, as shown in Figure 23, the valve actuating slide is held against movement by detent fingers 79 as shown in Figure 5, such fingers being pivoted at 80 to the block 43 and engaging in notches 81 of the valve actuating slide. After the fingers 79 release the valve actuating slide and the same moves to its other extreme of movement, it is engaged by detent fingers 82 pivoted to block 43 at 83 and engageable in notches 84 of the valve actuating slide.

Leaf springs 85 are fastened to the ends of the block 43 and engage the fingers 79 and 82 and urge them into engagement with their respective notches.

Actuating rods 86 and 87, are employed to spread or release the detent fingers 79 and 82, respectively, from the valve actuating slide 76. Such rods are slidably mounted in blocks 42 and 33, respectively, a stuffing box 88 preferably being provided in the block 42 about the rod 86. The valve actuating slide has inwardly extending guide members 89 and 90, through which the rods 86 and 87 pass and coil springs 91 and 92 surround the rods 86 and 87 engaging abutments 93 and 94 thereon, respectively, and also engaging the projections or abutments 89 and 90. The fingers 79 have inwardly extending projections 95 terminating relatively close to each other and the fingers 82 have similar projections 96. The free ends of the rods 86 and 87 are arranged for abutment respectively, by the piston heads 50 and 46. The springs 91 and 92 are under tension, one at a time. Thus with the valve in the exhaust position as in Figures 4 and 5, the spring 91 is under tension as a result of the previous movement of the valve actuating slide 76, and is so held by the fingers 79. The upward movement of the piston head 50 will engage the rod 86, forcing the upper pointed end thereof between the projections 95, thus spreading the fingers 79 whereupon spring 91 will cause slide 76 to move to its uppermost or other position, so that through the intermeshing of clutch teeth 97 thereon with the pinion 75, the valve 58 will move to vertical position, during which movement the detent 82 will snap into the notches 84 and hold the valve in that position until the descent of piston 46, the same on descent engaging the rod 87, which movement first compresses spring 92, then spreads the projections 96 and disengages the detent 82 from the valve actuating slide, which spring 92, being under tension, thereafter causes the valve actuating slide to move to its lowermost position to return the valve to exhaust position and cause reengagement of the detent 79 with the slide. In this manner, with power fluid constantly supplied, the pistons operate, as hereinbefore described, to alternately move the valve 58 to position to direct the fluid pressure and to exhaust the same, resulting in pumping action.

By providing the ports 70 from the exhaust pipes 69 into the flow line 25 through block 24, the exhaust fluid is utilized to assist in elevating the fluid pumped from the well and to, in a measure, relieve the weight on piston 46. Furthermore by arranging the exhaust from passage 66 into the space between blocks 33 and 43 and locating the relief valve 57 in this space any discharge by said valve also escapes through the exhaust pipes 69 and their connections.

Various changes may be resorted to provided they fall within the spirit and scope of the invention.

I claim as my invention:—

1. An apparatus of the class described having a fluid pressure operated pumping mechanism including a head, means cooperating with said head to provide a chamber to receive power fluid, said head having a nipple in the chamber, a connection from the head to supply fluid to the pump to operate the same, a flow tube slidably mounted through the head and on the nipple, said flow tube and nipple having openings adapted to register through sliding movement of the flow tube whereby the power fluid may pass through the flow tube for the purpose specified.

2. In a forced feed fluid transporting mechanism having a fluid operated motor, pumping mechanism including a barrel head, a barrel section secured to said barrel head, a flow pipe passing through said head, and the barrel head being provided with passages therethrough communicating with the flow pipe and in communication with the exhaust of said motor so that the motor will operate the pumping mechanism.

In testimony whereof I affix my signature.

JOHN M. WOLF.